(12) United States Patent
Cheng et al.

(10) Patent No.: US 9,027,893 B2
(45) Date of Patent: May 12, 2015

(54) HANGING DEVICE (71) Applicant: Aopen Inc., New Taipei (TW)

(72) Inventors: Sheng-Hsiung Cheng, New Taipei (TW); Te-An Lin, New Taipei (TW); Chih-Hsiung Chen, New Taipei (TW)

(73) Assignee: Aopen Inc., New Taipei (TW)

( * ) Notice: Subject to any disclaimer, the term of this patent is extended or adjusted under 35 U.S.C. 154(b) by 108 days.

(21) Appl. No.: 13/832,591

(22) Filed: Mar. 15, 2013

(65) Prior Publication Data

US 2013/0320169 A1  Dec. 5, 2013

(30) Foreign Application Priority Data

Jun. 5, 2012 (TW) .............................. 101120188 A (51) Int. Cl.
*A47F 5/08* (2006.01)
*F16M 13/02* (2006.01)
*F16M 11/12* (2006.01)
*F16M 11/18* (2006.01)

(52) U.S. Cl.
CPC ............. *F16M 13/022* (2013.01); *F16M 11/12* (2013.01); *F16M 11/18* (2013.01); *F16M 13/02* (2013.01); *Y10S 248/917* (2013.01); *Y10S 248/923* (2013.01)

(58) Field of Classification Search
CPC .. A63B 29/025; A63B 29/024; A63B 29/027; H04R 1/6183; A47F 5/00; F16M 13/022; F16M 13/02
USPC ......... 248/917, 918, 919, 920, 921, 922, 923, 248/371, 397, 284.1, 292.14, 346.07, 201, 248/176.1; 361/679.02, 679.22, 679.58, 361/681; 108/5
See application file for complete search history.

(56) References Cited

U.S. PATENT DOCUMENTS

| 2,791,388 | A | * | 5/1957 | Hirt | 248/495 |
|---|---|---|---|---|---|
| 2,965,339 | A | * | 12/1960 | Denton | 248/495 |
| 4,892,284 | A | * | 1/1990 | Kelrick | 248/476 |
| 5,791,625 | A | * | 8/1998 | Orser | 248/495 |
| 6,431,511 | B1 | * | 8/2002 | Pfister | 248/274.1 |
| 6,578,812 | B2 | * | 6/2003 | Lemire | 248/551 |
| 6,604,722 | B1 | * | 8/2003 | Tan | 248/276.1 |
| 6,659,418 | B2 | * | 12/2003 | Lemire | 248/495 |
| 6,796,540 | B1 | * | 9/2004 | Manceor | 248/284.1 |
| 7,793,903 | B2 | * | 9/2010 | Dittmer et al. | 248/276.1 |
| 7,857,270 | B2 | * | 12/2010 | Short et al. | 248/284.1 |
| 7,918,426 | B2 | * | 4/2011 | Short et al. | 248/276.1 |
| 8,109,485 | B2 | * | 2/2012 | VanLanen et al. | 248/371 |
| 8,123,182 | B2 | * | 2/2012 | Sonntag et al. | 248/220.22 |

(Continued)

FOREIGN PATENT DOCUMENTS

WO   2011099999 A1   8/2011

*Primary Examiner* — Monica Millner
(74) *Attorney, Agent, or Firm* — Hammer & Associates, P.C.

(57) ABSTRACT

A hanging device includes a wall-connecting frame, an object-connecting frame, and a plurality of connectors. The wall-connecting frame includes a connecting bracket that has a plurality of connecting holes formed in front and rear end faces thereof. The object-connecting frame is connected to the connecting bracket and is adapted for connection with an object. Each connector extends through one of the connecting holes in the rear end face and a corresponding connecting hole in the front end face, and is connected to the object-connecting frame. The connectors are operable to move the object-connecting frame forwardly and rearwardly relative to the wall-connecting frame.

17 Claims, 10 Drawing Sheets

(56) References Cited

U.S. PATENT DOCUMENTS

| | | |
|---|---|---|
| 8,191,837 B2 * | 6/2012 | Chen et al. ............... 248/176.1 |
| 8,267,362 B2 * | 9/2012 | Cheng et al. ............. 248/201 |
| 8,523,132 B2 * | 9/2013 | Chen et al. ............... 248/309.1 |
| 8,740,164 B2 * | 6/2014 | Tachibana ................. 248/276.1 |
| 2005/0082453 A1 * | 4/2005 | Chuang ..................... 248/300 |
| 2005/0127263 A1 * | 6/2005 | Lemire ...................... 248/475.1 |
| 2008/0192418 A1 * | 8/2008 | Zambelli et al. ......... 361/681 |

* cited by examiner

HANGING DEVICE

CROSS-REFERENCE TO RELATED APPLICATION

This application claims priority of Taiwanese Patent Application No. 101120188, filed on Jun. 5, 2012, the disclosure of which is incorporated herein by reference.

BACKGROUND OF THE INVENTION

1. Field of the Invention

The invention relates to a hanging device, and more particularly to a hanging device for hanging an object.

2. Description of the Related Art

Existing flat panel display is hung on a wall surface mostly by a hanging frame. Since the wall surface is prone to have an uneven surface, and the hanging frame has no structural design for forward and rearward fine adjustment, after the hanging frame is fixed to the wall surface, the flat panel display is likely to be hung obliquely relative to the wall surface.

In addition, when a plurality of flat panel displays are joined together to form a video wall, besides being affected by the above-mentioned unevenness of the wall surface, the video wall is also affected by the assembly tolerances between the hanging frames and the corresponding flat panel displays and between the wall surface and the hanging frames, so that a gap is formed between each two adjacent ones of the flat panel displays. This leads to an uneven state of the video wall. Hence, the quality of image presented by the video wall is adversely affected.

SUMMARY OF THE INVENTION

Therefore, an object of the present invention is to provide a hanging device that is capable of hanging an object and that can easily and quickly fine adjust the position of the object.

Another object of the present invention is to provide a hanging device that has a simple structure so as to reduce the assembly working hour and to save manufacturing costs.

The purpose of the present invention and the solution to the conventional technical problems are achieved through employment of the below technical means. According to the disclosure of this invention, a hanging device comprises a wall-connecting frame, an object-connecting frame, and a plurality of connectors. The wall-connecting frame includes a connecting bracket that has a front end face, a rear end face, and a plurality of connecting holes formed in the front and rear end faces. The object-connecting frame is connected to the connecting bracket, is located in front of the front end face, and is adapted for connection with an object. Each of the connectors extends through one of the connecting holes in the rear end face and a corresponding one of the connecting holes in the front end face, and is connected to the object-connecting frame. The connectors are operable to move the object-connecting frame forwardly and rearwardly relative to the wall-connecting frame.

Through the above-mentioned technical means, the advantages and effects of the present invention reside in that: through the provision of the connectors and the bottom fasteners, the hanging device of this embodiment is capable of fine adjusting the position of the object along the front-rear direction; through the provision of the top fasteners, the hanging device is capable of fine adjusting the position of the object along the top-bottom direction; and through the provision of the connecting bracket which is movable relative to the abutment endplate along the left-right direction, the hanging device is capable of fine adjusting the position of the object along the left-right direction. Therefore, the position of the object may be fine adjusted conveniently and quickly in multiple directions. Additionally, the structure of the hanging device is simple, so that the assembly working hour can be reduced and the manufacturing costs can be saved.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE PREFERRED EMBODIMENT

The above-mentioned and other technical contents, features, and effects of this invention will be clearly presented from the following detailed description of one embodiment in coordination with the reference drawings.

Figure 1:
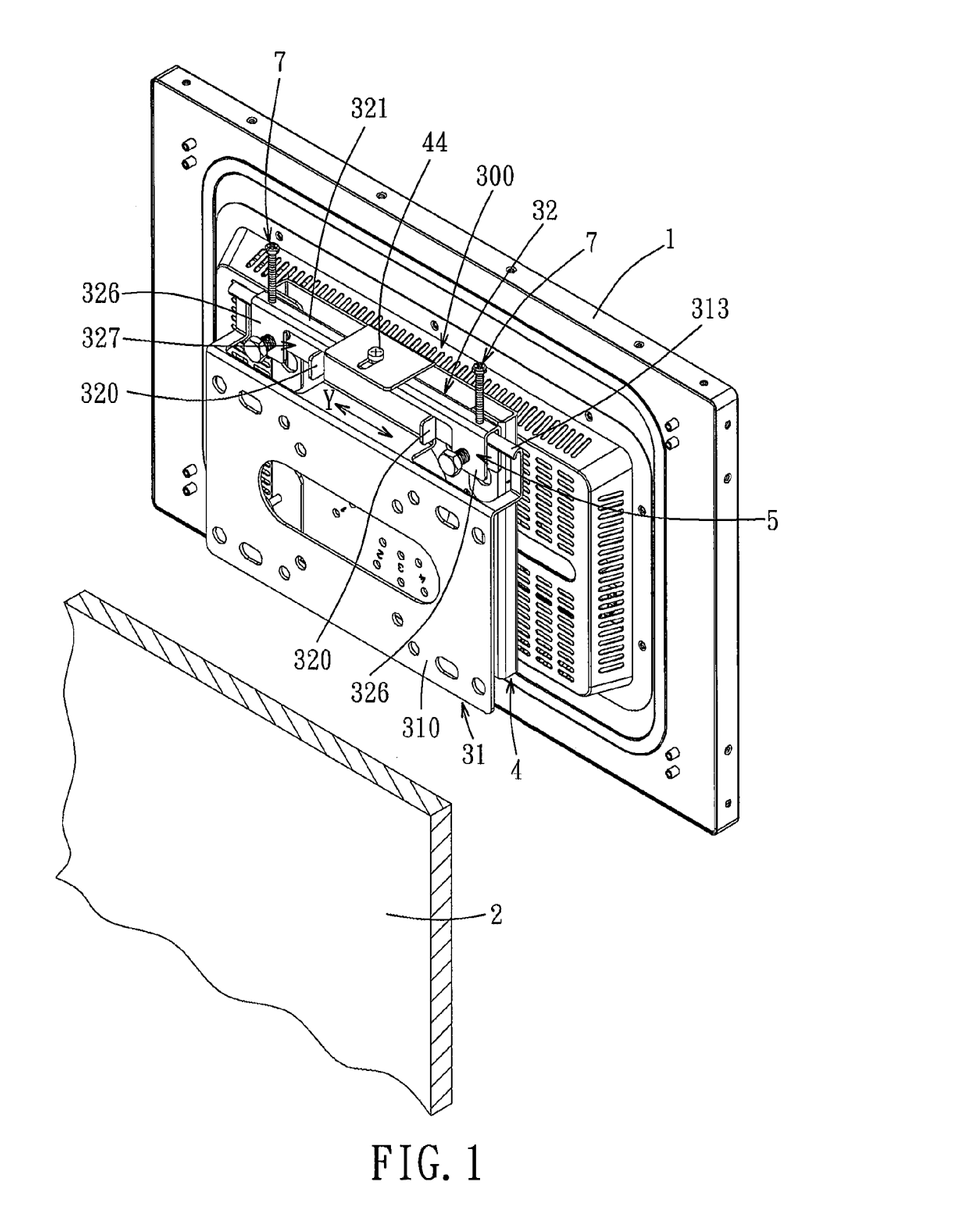
FIG. 1 is a perspective view of a hanging device according to the embodiment of the present invention installed on an object.
Figure 2:
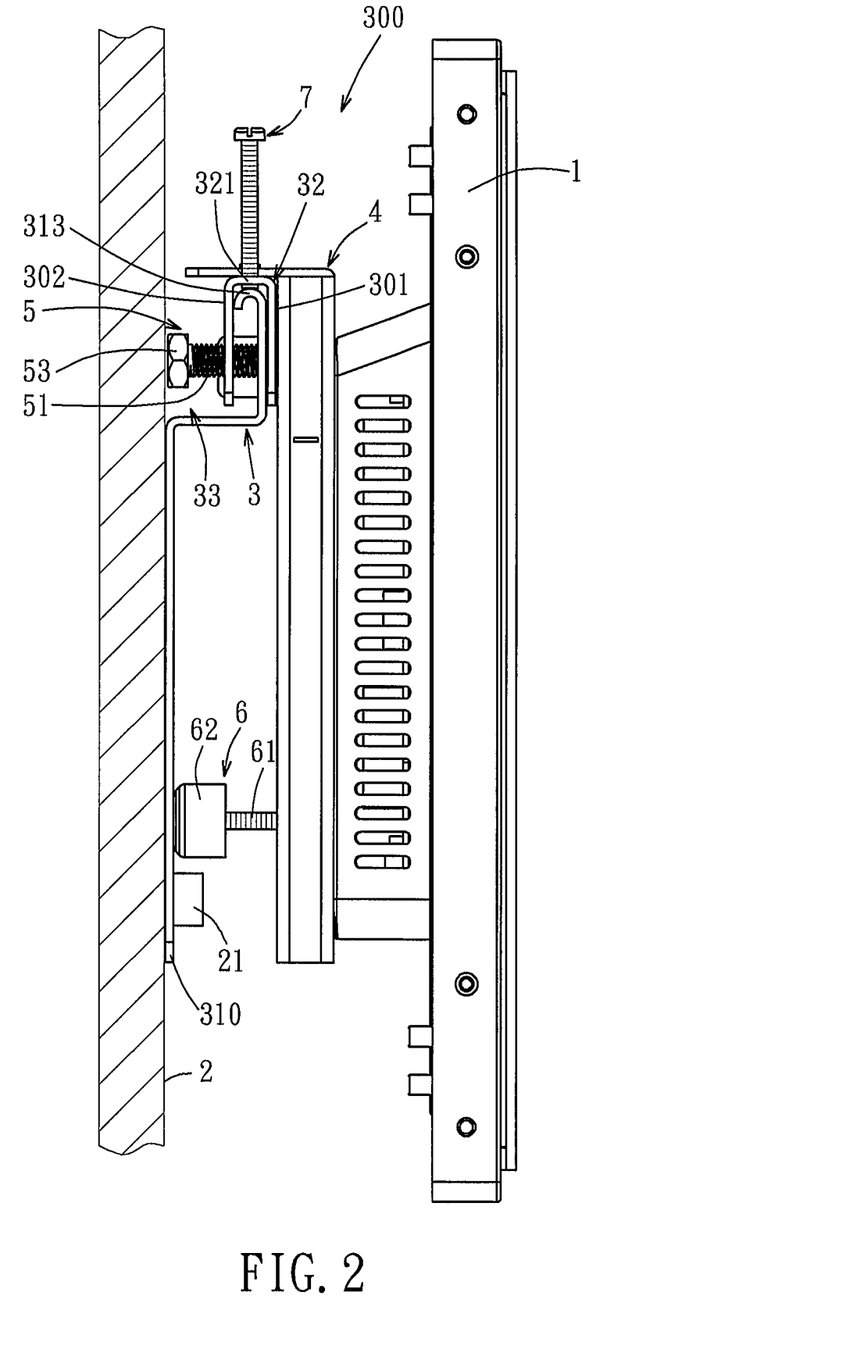
FIG. 2 illustrates the hanging device of this invention hanging the object on a wall surface.

Referring to FIGS. 1 and 2, a hanging device 300 according to the embodiment of the present invention is suitable for hanging an object 1 on a wall surface 2. In this embodiment, the object 1 is exemplified as a flat panel display, such as a liquid crystal display or a plasma display. It should be noted that the object 1 may also be a glass plate or a decorative plate for beautifying the appearance of a building, an LED display billboard, or other objects which need to be hung on the wall surface 2 through the hanging device 300.

Figure 3:
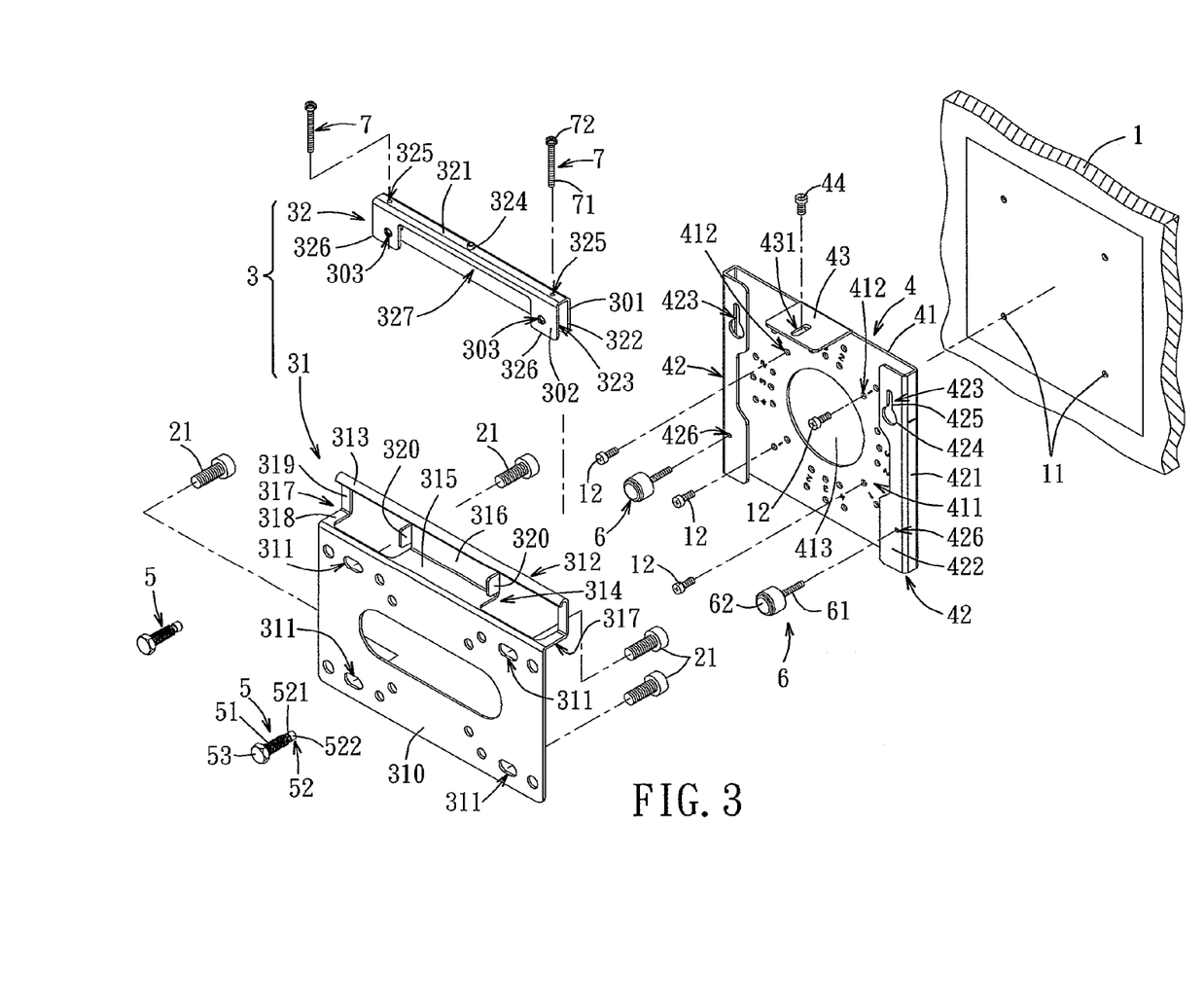
FIG. 3 is an exploded perspective view of the embodiment.
Figure 4:
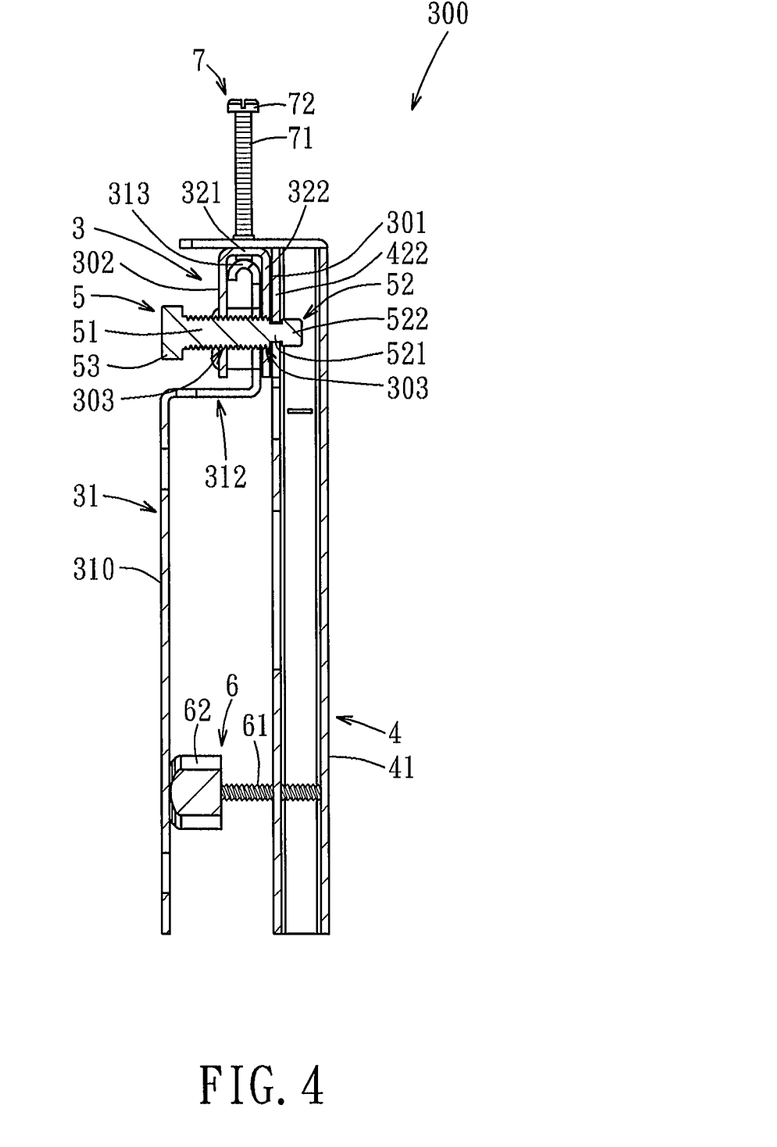
FIG. 4 is a sectional view of the embodiment in an assembled state.

Referring to FIGS. 3 and 4, in combination with FIG. 2, the hanging device 300 comprises a wall-connecting frame 3, an object-connecting frame 4, and a plurality of connectors 5. The wall-connecting frame 3 includes a connecting bracket 32 having a front end face 301, a rear end face 302, and a plurality of connecting holes 303 formed in the front end face 301 and the rear end face 302. The object-connecting frame 4 is hangingly connected to the wall-connecting frame 3 and is located in front of the front end face 301. The object 1 is connected to the object-connecting frame 4. Each of the connectors 5 extends movably through one of the connecting holes 303 in the rear end face 302 and a corresponding connecting hole 303 in the front end face 301, and is connected to the object-connecting frame 4. The object-connecting frame 4 with the attached object 1 can move forward and rearward relative to the wall-connecting frame 3 by operating the connectors 5. Through such a configuration, the position of the object 1 may be fine adjusted conveniently and quickly, so that the object 1 may be hung on the wall surface 2 evenly.

The specific structure and operation of the hanging device 300 will be described in detail below.

As shown in FIGS. 2, 3 and 4, the wall-connecting frame 3 includes a support bracket 31 and a connecting bracket 32. The support bracket 31 includes a fixed plate 310 adapted to be fixed on the wall surface 2 and formed with a plurality of through slots 311, and a supporting plate 312 protruding forwardly from the fixed plate 310 to support the connecting bracket 32. The supporting plate 312 includes an elongated abutment end plate 313, an L-shaped first protruding plate 314, and two L-shaped second protruding plates 317 located on left and right sides of and spaced apart from the first protruding plate 314. The first protruding plate 314 includes a first horizontal plate section 315 extending forwardly from a top end of the fixed plate 310, and a first vertical plate section 316 extending upwardly from a front end of the first horizontal plate section 315. Each of the second protruding plates 317 includes a second horizontal plate section 318 extending forwardly from the top end of the fixed plate 310, and a second vertical plate section 319 extending upwardly from a front end of the second horizontal plate section 318. The abutment end plate 313 extends along a left-right direction, and is connected to top ends of the first and second vertical plate sections 316, 319. Because the first and second protruding plates 314, 317 are connected between the fixed plate 310 and the abutment end plate 313, the abutment end plate 313 has a strong structural strength that can stably support the connecting bracket 32, the object-connecting frame 4, and the object 1.

The connecting bracket 32 is inverted U-shaped and is hung movably on the supporting plate 312. The connecting bracket 32 includes a top plate 321 that is abuttable against the abutment end plate 313, and a first plate 322 and a second plate 323 extending downwardly and respectively from front and rear ends of the top plate 321. The top plate 321 is formed with two top screw holes 325 spaced apart from each other in the left-right direction and extending along a top-bottom direction that is perpendicular to the left-right direction. The first plate 322 has the front end face 301. The second plate 323 has the rear end face 302. The connecting holes 303 are formed in the first and second plates 322, 323. In this embodiment, the first plate 322 is formed with two connecting holes 303 spaced apart from each other in the left-right direction, and the second plate 323 is also formed with two connecting holes 303 that correspond in position to and that cooperate with the connecting holes 303 in the first plate 322 to form two pairs of connecting holes 303 in the connecting bracket 32. The two pairs of the connecting holes 303 are spaced apart from each other in the left-right direction. The connecting bracket 32 is movable relative to the abutment end plate 313 along the left-right direction.

Because the rear end face 302 of the connecting bracket 32 is disposed in front of and is spaced apart from the fixed plate 310, when the fixed plate 310 is fixed to the wall surface 2, a space 33 is formed between the rear end face 302 and the wall surface 2 to allow movement of the connectors 5 in a front-rear direction that is perpendicular to the left-right direction and the top-bottom direction. It should be noted that the distance between the rear end face 302 of the connecting bracket 32 and the fixed plate 310 may be adjusted depending on the length of the connectors 5 and the amount of movement thereof. The precondition is that the size of the space 33 must be big enough to allow movement of the connectors 5 along the front-rear direction.

In this embodiment, the hanging device 300 is provided with two connectors 5. Each of the connectors 5 includes a connecting shank 51 extending through a respective pair of the connecting holes 303 in the connecting bracket 32, a shank end portion 52 formed at a front end of the connecting shank 51 and located in front of the front end face 301, and a head 53 formed at a rear end of the connecting shank 51 and located behind the rear end face 302. The shank end portion 52 is configured to be connected to the object-connecting frame 4. Each of the connecting holes 303 is a screw hole. Each of the connectors 5 is a bolt. The connecting shank 51 of each connector 5 is a threaded shank that is movably screwed into the respective pair of the connecting holes 303. When each connector 5 is rotated clockwise or counterclockwise, the object-connecting frame 4 and the object 1 can move forward or rearward relative to the wall-connecting frame 31 so as to fine adjust the position of the object 1 along the front-rear direction.

It should be noted that, although each connector 5 in this embodiment is exemplified as a bolt, the connecting shank 51 of each connector 5 may be a cylindrical body, and each of the connecting holes 303 may be a circular hole. The connecting shank 51 may extend through the respective pair of the connecting holes 303 and be in frictional contact with walls that respectively define the pair of the connecting holes 303. In this case, a force must be applied to push each connector 5 to move relative to the connecting holes 303 along the front-rear direction. The effect of fine adjusting the position of the object 1 along the front-rear direction may be similarly achieved.

The object-connecting frame 4 includes a main plate 41 adapted to be connected to the object 1, and two connecting plates 42 respectively connected to left and right ends of the main plate 41. The main plate 41 is formed with a circular central hole 413, and is provided with a plurality of sets of connecting units 411 that are arranged around the central hole 413 in an alternating manner. In this embodiment, each set of the connecting units 411 includes four angularly spaced-apart mounting holes 412 formed in the main plate 41 and corresponding in position to four positioning screw holes 11 in a back surface of the object 1. The object 1 is fixed to the main plate 41 by extending a plurality of screw bolts 12 through the respective mounting holes 412 and screwed fixedly and respectively into the positioning screw holes 11. Because the sets of the connecting units 411 are arranged at different angular positions, the object 1 may be selectively fixed to the mounting holes 412 in one of the sets of the connecting units 411. Through this configuration, the object 1 may be fixed to the main plate 41 at different angular positions according to actual requirements.

Each of the connecting plates 42 is substantially L-shaped, and includes a side plate portion 421 extending rearwardly from one of the left and right ends of the main plate 41, and a rear plate portion 422 extending transversely and inwardly from a rear end of the side plate portion 421. The rear plate portion 422 is located behind and is spaced apart from the main plate 41, and is formed with an engaging hole 423 that is proximate to a top end thereof. The shank end portion 52 of each connector 5 extends through and engages the engaging hole 423 in the rear plate portion 422 of a respective connecting plate 42, so that each connector 5 may be connected to the object-connecting frame 4. Particularly, in this embodiment, the engaging hole 423 includes a circular hole portion 424, and an elongated hole portion 425 communicating with a top end of the circular hole portion 424 and having a width smaller than a diameter of the circular hole portion 424.

The shank end portion 52 of each connector 5 includes a small diameter section 521 connected to the connecting shank 51, and a large diameter section 522 connected to the small diameter section 521 opposite to the connecting shank 51. The small diameter section 521 has a diameter smaller than those of the large diameter section 522 and the connecting shank 51.

The object-connecting frame 4 further includes a top plate 43 extending rearwardly and horizontally from a top end of the main plate 41. The top plate 43 is located at a central portion of the main plate 41, and is formed with an elongated guide hole 431 that extends along the front-rear direction. The connecting bracket 32 further includes an internally threaded stud 324 projecting upwardly from the top plate 321 into the elongated guide hole 431. A screw 44 is screwed into the internally threaded stud 324 and abuts against the top plate 43, so that the object-connecting frame 4 may be prevented from detaching from the connecting bracket 32 and the top plate 43 may slide forward and rearward relative to the connecting bracket 32.

Further, the rear plate portion 422 of each connecting plate 42 is further formed with a bottom screw hole 426 located below and spaced apart from the engaging hole 423 and extending along the front-rear direction. The hanging device 300 further comprises two bottom fasteners 6. Each bottom fastener 6 includes a threaded shank portion 61 that is movably screwed into the bottom screw hole 426 of the rear plate portion 422 of the respective connecting plate 42, and a head portion 62 formed at a rear end of the threaded shank portion 61 and abutting against the fixed plate 310. Through the engagement of the threaded shank portion 61 of each bottom fastener 6 with the bottom screw hole 426 in the respective connecting plate 42, as each bottom fastener 6 is rotated clockwise or counterclockwise, the object-connecting frame 4 and the object 1 can move forward or rearward relative to the wall-connecting frame 31 so as to fine adjust the position of the object 1 along the front-rear direction. It should be noted that, in this embodiment, although two connectors 5 and two bottom fasteners 6 cooperate to fine adjust the object-connecting frame 4 and the object 1 along the front-rear direction, in an alternative embodiment, four connectors 5 may be used and the bottom fasteners 6 may be omitted.

The hanging device 300 further comprises two top fasteners 7. Each top fastener 7 includes a threaded shank portion 71 that is movably screwed into a respective one of the top screw holes 325 and that is configured to pressingly abut against the abutment end plate 313, and a head portion 72 formed at a top end of the threaded shank portion 71. Through the engagement of the threaded shank portion 71 of each top fastener 7 with the respective top screw hole 325, as each top fastener 7 is rotated clockwise or counterclockwise, the connecting bracket 32 together with the object-connecting frame 4 and the object 1 can move upward or downward relative to the wall-connecting frame 31 so as to fine adjust the position of the object 1 along the top-bottom direction.

Figure 5:
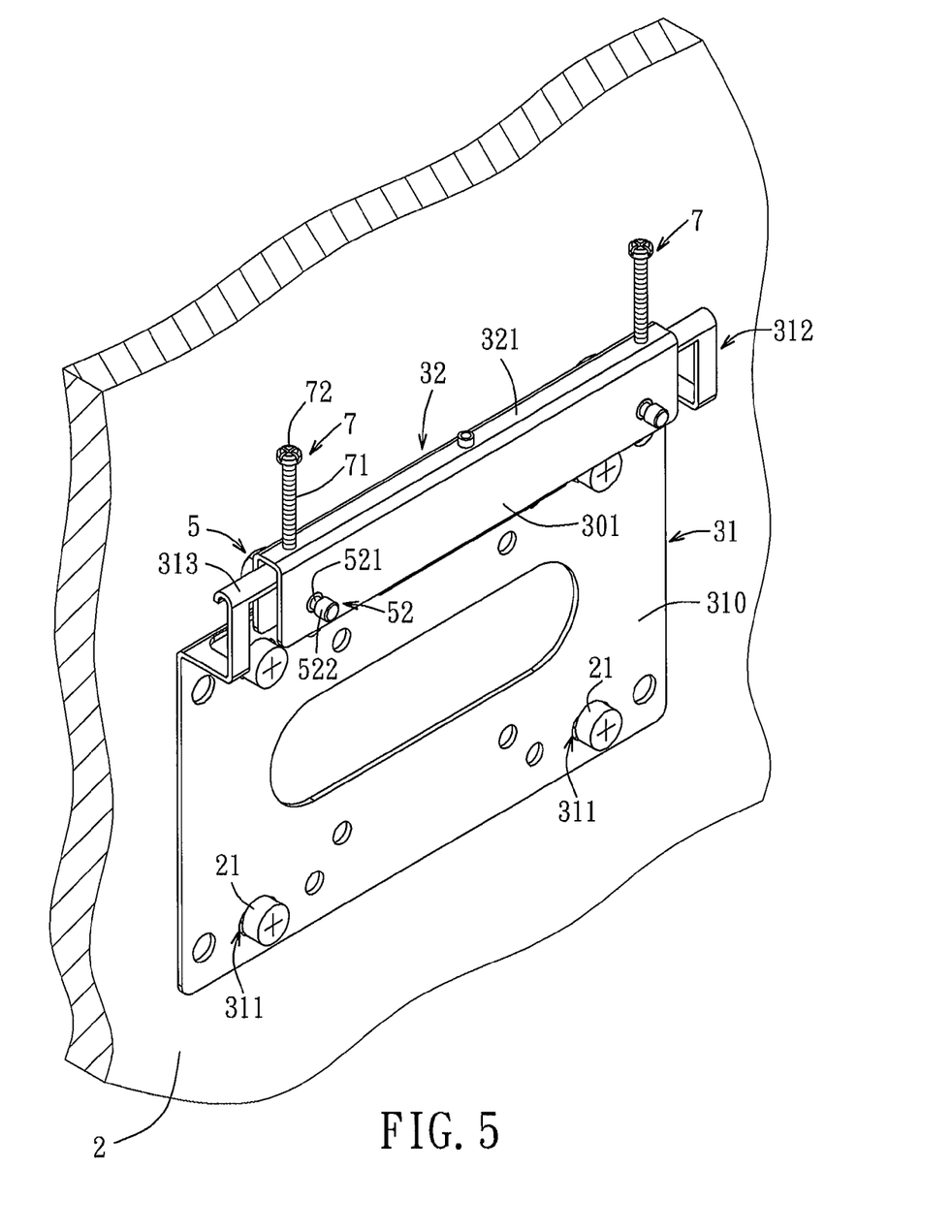
FIG. 5 illustrates how the hanging device of this invention is fixed to the wall surface.

As shown in FIGS. 3, 4 and 5, to assemble the hanging device 300, the connecting bracket 32 is first hung on the abutment end plate 313 of the supporting plate 312 of the support bracket 31, after which the connecting shank 51 of each connector 5 is screwed into the respective pair of the connecting holes 303, such that the shank end portion 52 of each connector 5 protrudes out of the front end face 301 of the connecting bracket 32. Further, the threaded shank portion 71 of each top fastener 7 is screwed into the respective top screw hole 325, such that the threaded shank portion 71 abuts against the abutment end plate 313. Then, the support bracket 31 is fixed to the wall surface 2 by extending a plurality of screw bolts 21 through the respective through slots 311 in the fixed plate 310 and engaging respectively positioning screw holes (not shown) in the wall surface 2.

Figure 6:
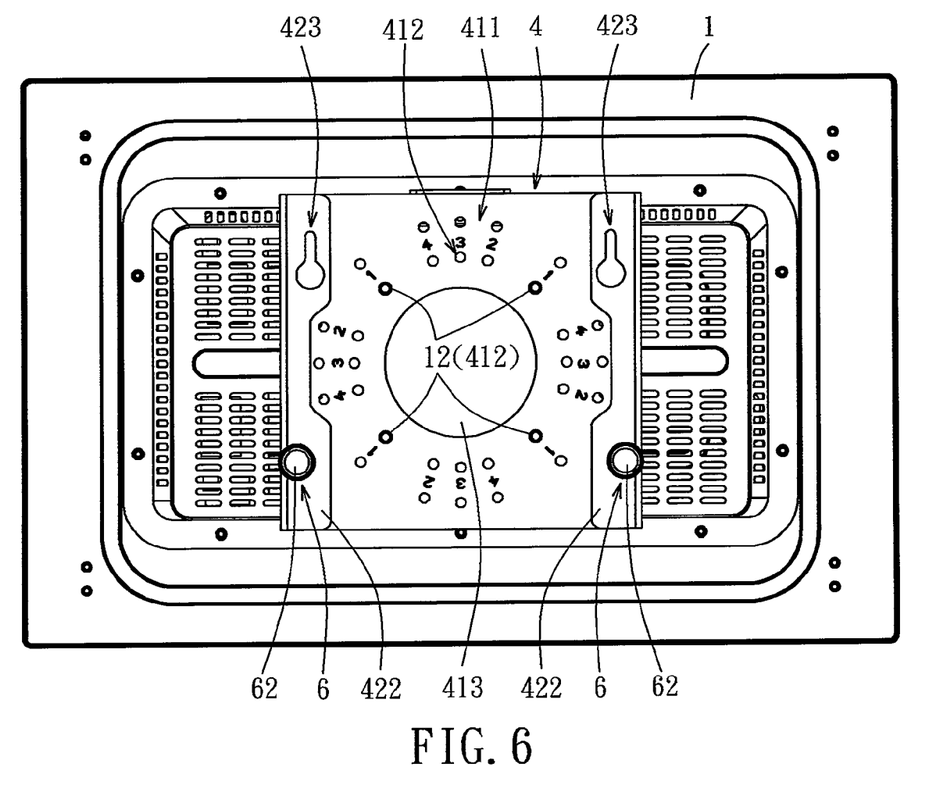
FIG. 6 illustrates how an object-connecting frame of the embodiment is fixed to the object.

With reference to FIG. 6, in combination with FIGS. 2 to 4, on the other hand, the screw bolts 12 are inserted respectively through the mounting holes 412 of a selected one set of the connecting units 411, and are screwed fixedly and respectively into the positioning screw holes 11 in the object 1, so that the object 1 is fixed to the main plate 41. In addition, the threaded shank portion 61 of each bottom fastener 6 is screwed into the bottom screw hole 426 of the respective connecting plate 42. The object-connecting frame 4 with the attached object 1 is then brought close to the connecting bracket 32 such that the large diameter section 522 of the shank end portion 52 of each connector 5 extends through the circular hole portion 424 of the engaging hole 423 in the respective connecting plate 42 until the small diameter section 521 corresponds in position to the engaging hole portion 425. The object-connecting frame 4 is then moved downward by a distance, so that the small diameter sections 521 of the shank end portions 52 of the connectors 5 are insertedly engaged with the elongated hole portions 425 of the respective connecting plates 42, and the internally threaded stud 324 of the connecting bracket 32 is inserted into the elongated guide hole 431 of the top plate 43 to engage with the screw 44. At this time, the rear plate portion 422 of each connecting plate 42 is positioned between the connecting shank 51 and the large diameter section 522 of the corresponding connector 5, and the object-connecting frame 4 with the attached object 1 is hangingly engaged to the shank end portions 52 of the connectors 5. Hence, the object 1 is hung on the wall surface 2 through the hanging device 300.

Figure 7:
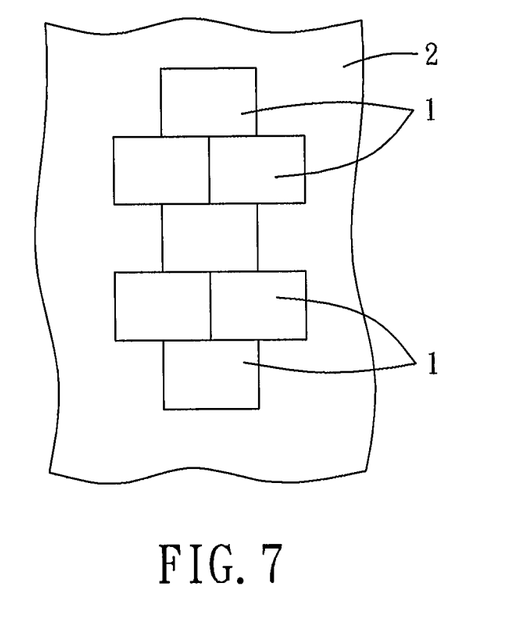
FIG. 7 is a schematic diagram, illustrating a plurality of objects being hung on a wall surface using the hanging device of this invention and being joined together to form a video wall.
Figure 8:
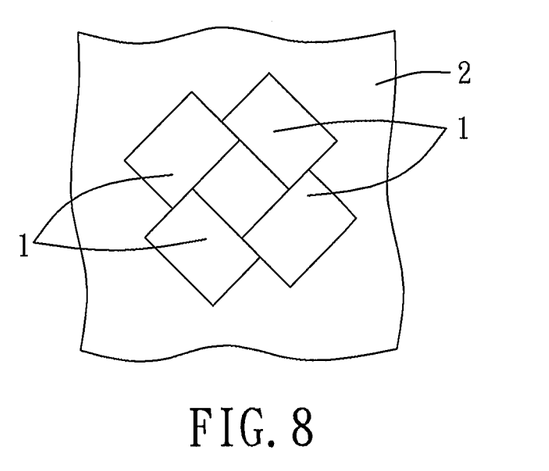
FIG. 8 is a view similar to FIG. 7, but illustrating the objects being joined together to form a video wall having a different shape.
Figure 9:
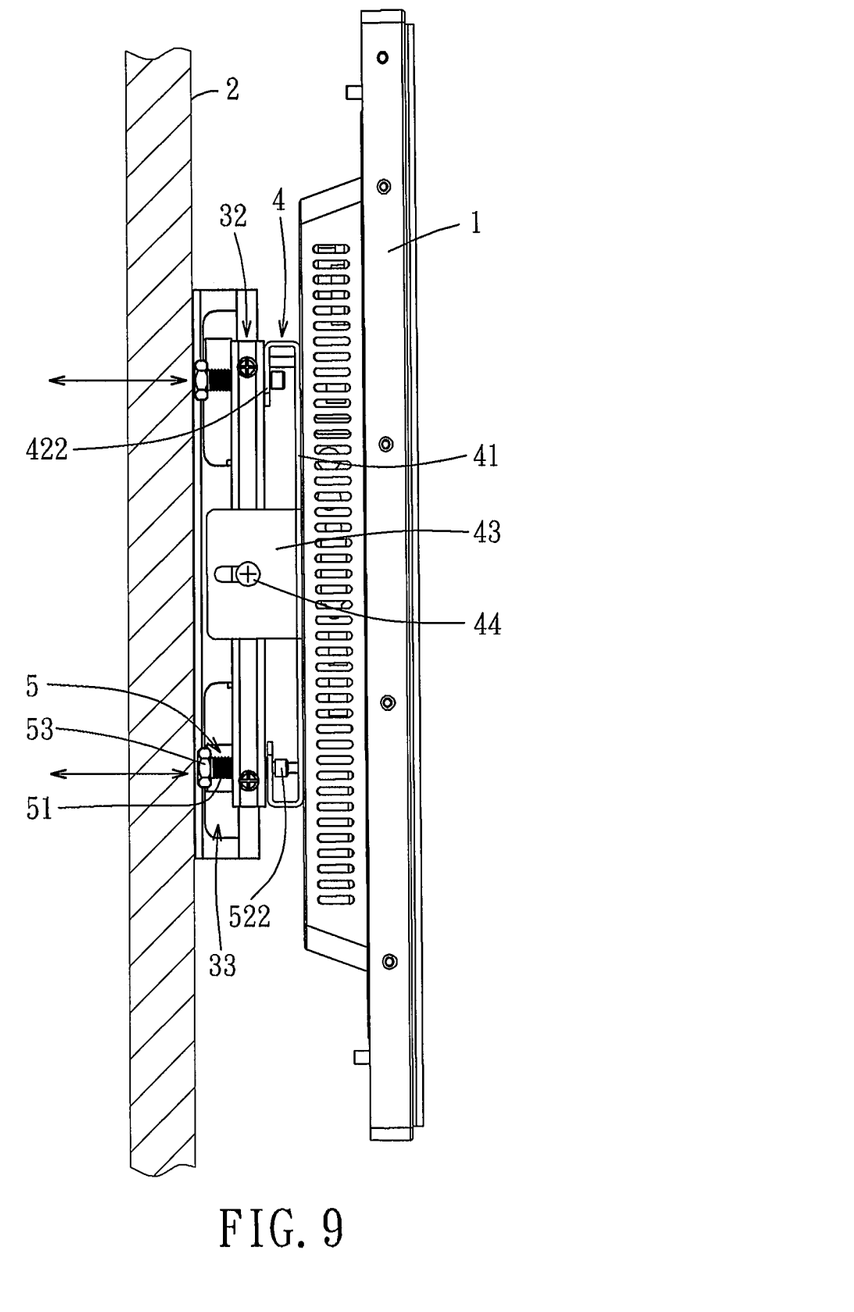
FIG. 9 is a schematic top view of the embodiment, illustrating how the object-connecting frame and the object can be moved forward or rearward by rotating the connectors.

Referring to FIGS. 7 to 9, in combination with FIG. 2, when a plurality of the objects 1 are joined together to form a video wall (see FIG. 7 or 8), if two adjacent ones of the objects 1 are in an uneven state, an auxiliary tool, such as a hexagonal wrench, may be inserted into the space 33 to rotate the head 53 of each connector 5 in a clockwise or counterclockwise direction so as to move the object-connecting frame 4 and the object 1 forwardly or rearwardly, thereby adjusting the position of the object 1 along the front-rear direction. Or, the auxiliary tool may be inserted between the object-connecting frame 4 and the fixed plate 310 to rotate the head portion 62 of each bottom fastener 6 so as to move the object-connecting frame 4 and the object 1 forwardly or rearwardly, thereby also adjusting the position of the object 1 along the front-rear direction.

Figure 10:
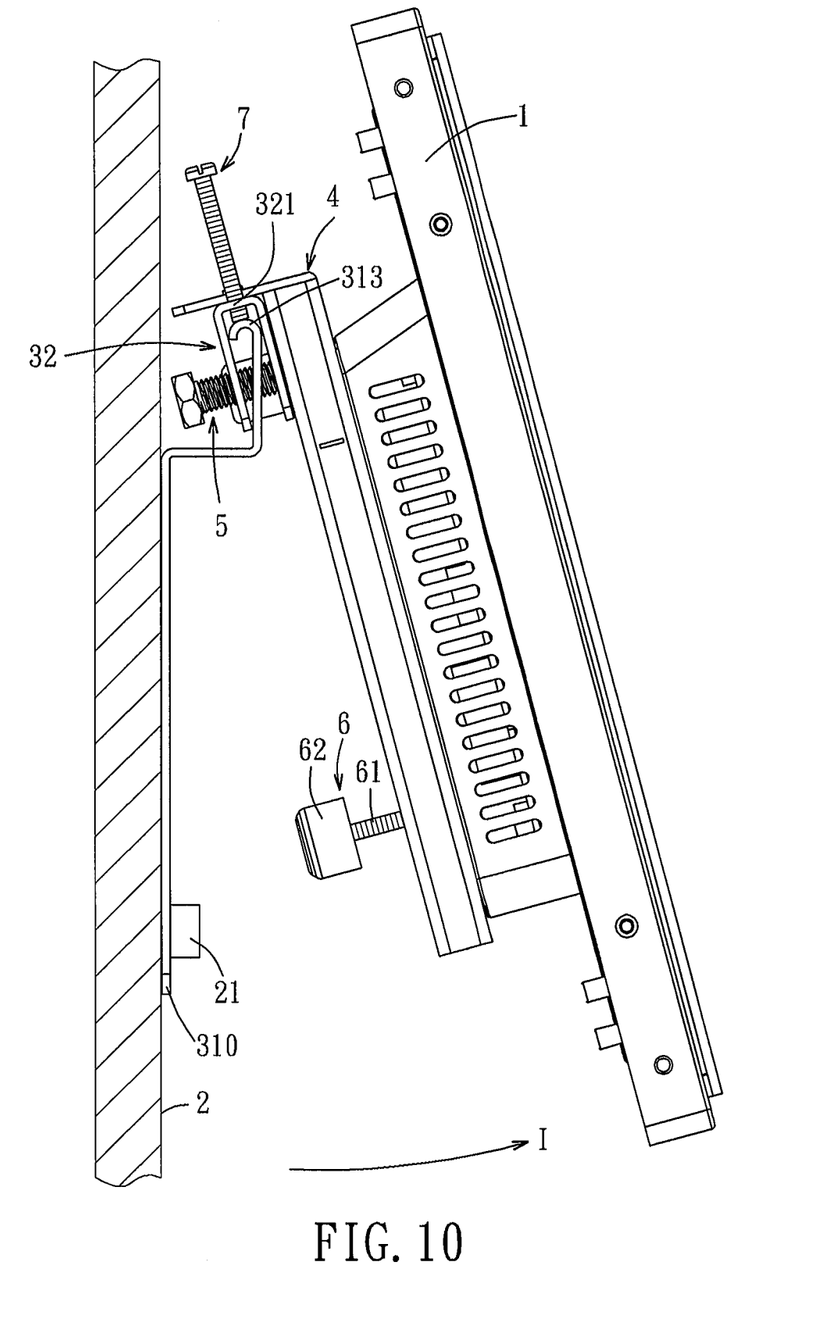
FIG. 10 is a view similar to FIG. 2, but illustrating how an angular movement of the object-connecting frame and the object relative to a wall-connecting frame causes rotation of a connecting bracket relative to an abutment end plate.
Figure 11:
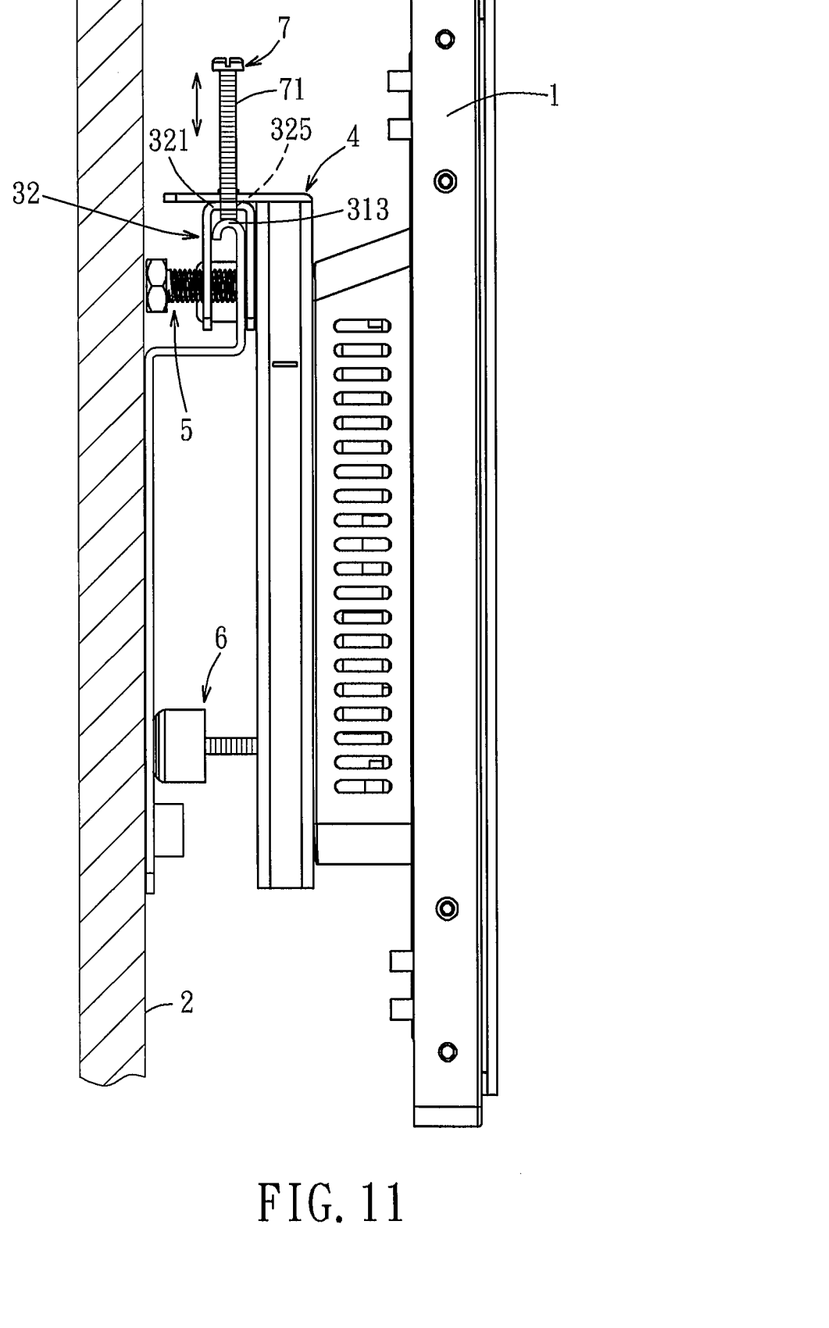
FIG. 11 is a view similar to FIG. 2, but illustrating how the object-connecting frame and the object can be moved upward and downward by rotating a top fastener.

Referring to FIG. 10, in combination with FIG. 3, in this embodiment, the abutment end plate 313 has an arc-shaped cross section. The second plate 323 of the connecting bracket 32 is inverted U-shaped, and includes two abutment portions 326 located on left and right sides of and spaced apart from the first protruding plate 314, and a cutout 327 located between the two abutment portions 326. Through such a configuration, a bottom end of the object-connecting frame 4 or the object 1 may be rotated in the direction indicated by an arrow (I) to facilitate a user to directly and manually rotate each bottom screw 6. During this time, the connecting bracket 32 is rotated about the abutment end plate 313 in the front-rear direction. Referring to FIG. 11, in combination with FIG. 2, if there is a height difference between each two adjacent ones of the objects 1 (see FIG. 7 or 8), the top fasteners 7 may be rotated using an auxiliary tool or manually to resolve the height difference. That is, when the top fasteners 7 are rotated clockwise, the connecting bracket 32 together with the object-connecting frame 4 and the object 1 can move upward; and, when the top fasteners 7 are rotated counterclockwise, the connecting bracket 32 together with the object-connecting frame 4 and the object 1 can move downward. Therefore, the position of each object 1 may be fine adjusted along the top-bottom direction to place the two adjacent ones of the objects 1 at the same height.

With reference to FIGS. 1 and 3, if there is a gap between two adjacent ones of the objects 1 (see FIG. 7 or 8) in the left-right direction, each object 1 may be pushed manually along the left-right direction, so that the object 1 along with the object-connecting frame 4 and the connecting bracket 32 can move to the left or right relative to the abutment endplate 313. Hence, the position of each object 1 may be fine adjusted along the left-right direction, so that the two adjacent objects 1 may be placed in tight contact with each other. Further, in this embodiment, the first protruding plate 314 further includes two stop plates 320 protruding rearwardly and respectively from left and right ends of the first vertical plate section 316. The cutout 327 permits extension of the stop plates 320 therethrough. Each of the stop plates 320 is configured to abut against a respective one of the abutment portions 326, thereby limiting movement of the connecting bracket 32 along the left-right direction. In addition, the second vertical plate section 319 of each second protruding plate 317 is configured to abut against the connecting shank 51 of a respective one of the connectors 5, thereby also limiting movement of the connecting bracket 32 along the left-right direction.

To sum up, through the provision of the connectors 5 and the bottom fasteners 6, the hanging device 300 of this embodiment is capable of fine adjusting the position of the object 1 along the front-rear direction. Further, through the provision of the top fasteners 7, the hanging device 300 is capable of fine adjusting the position of the object 1 along the top-bottom direction. Moreover, through the provision of the connecting bracket 32 which is movable relative to the abutment end plate 313 along the left-right direction, the hanging device 300 is capable of fine adjusting the position of the object 1 along the left-right direction. Therefore, the position of the object 1 may be fine adjusted conveniently and quickly in multiple directions. Additionally, the structure of the hanging device 300 is simple, so that the assembly working hour can be reduced and the manufacturing costs can be saved. Thus, the objects of the present invention can be achieved.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A hanging device for hanging an object on a wall surface, comprising:
    a wall-connecting frame including a support bracket and a connecting bracket, said support bracket including a fixed plate for fixing on the wall surface, and a supporting plate protruding forwardly from said fixed plate and having an abutment end plate, said connecting bracket being hung movably on said supporting plate, and having a rear end face located in front of and spaced apart from said fixed plate, a front end face opposite to said rear end face, and a plurality of connecting holes formed in said front end face and said rear end face of said connecting bracket, said connecting bracket being inverted U-shaped and including a top plate that is abuttable against said abutment end plate, and a first plate and a second plate extending respectively downward from front and rear ends of said top plate, said first plate and said second plate respectively having said front end face and said rear end face of said connecting bracket, said top plate being formed with two top screw holes spaced apart from each other in a left-right direction and extending along a top-bottom direction that is perpendicular to said left-right direction;
    two top fasteners movably and respectively screwed into said top screw holes and abutting against said abutment end plate;
    an object-connecting frame that is connected to said connecting bracket, that is located in front of said front end face of said connecting bracket, and that is adapted for connection with the object; and
    a plurality of connectors, each of which extends through one of said connecting holes in said rear end face of said connecting bracket and a corresponding one of said connecting holes in said front end face of said connecting bracket and each of which is connected to said object-connecting frame, said connectors being operable to move said object-connecting frame toward and away from said front end face of said connecting bracket.

2. The hanging device of claim 1, wherein each of said connectors includes a connecting shank extending through said one of said connecting holes in said rear end face of said connecting bracket and the corresponding said connecting hole in said front end face of said connecting bracket, and a shank end portion formed at a front end of said connecting shank and connected to said object-connecting frame.

3. The hanging device of claim 2, wherein each of said connecting holes in said front and rear end faces of said connecting bracket is a threaded hole, said connecting shank of each said connector being a threaded shank, each of said connectors further including a head formed at a rear end of said connecting shank and located behind said rear end face of said connecting bracket.

4. The hanging device of claim 1, wherein each of said top fasteners includes a threaded shank portion and a head portion formed at a top end of said threaded shank portion, said threaded shank portion being configured to press against said abutment end plate.

5. The hanging device of claim 1, wherein said abutment end plate is elongated and extends along said left-right direction, said connecting bracket being movable relative to said abutment end plate along said left-right direction.

6. The hanging device of claim 5, wherein said first plate has two said connecting holes, said second plate having two said connecting holes that correspond in position to and that cooperate with said two connecting holes in said first plate to form two pairs of said connecting holes in said connecting bracket, said two pairs of said connecting holes being spaced apart from each other in said left-right direction, said hanging device comprising two said connectors, each of said connectors including a connecting shank extending through a respective pair of said connecting holes, and a shank end portion that is formed at a front end of said connecting shank, that is located in front of said front end face, and that is connected to said object-connecting frame.

7. The hanging device of claim 6, wherein each of said connecting holes is a threaded hole, said connecting shank of each said connector being a threaded shank screwed into a corresponding pair of said connecting holes, each said connector further including a head formed at a rear end of said connecting shank and located behind said rear end face.

8. The hanging device of claim 6, wherein said object-connecting frame includes a main plate adapted to be connected to the object, and two connecting plates connected to left and right ends of said main plate, each of said connecting plates including a rear plate portion located behind and spaced apart from said main plate, said rear plate portion being formed with an engaging hole, said shank end portion extending through and engaging said engaging hole.

9. The hanging device of claim 8, wherein said engaging hole has a circular hole portion, and an elongated hole portion communicating with a top end of said circular hole portion and having a width smaller than a diameter of said circular hole portion, said shank end portion including a small diameter section connected to said connecting shank, and a large diameter section connected to said small diameter section opposite to said connecting shank, said small diameter section having a diameter smaller than those of said large diameter section and said connecting shank, said small diameter section being insertedly engaged with said elongated hole portion to position said rear plate portion between said connecting shank and said large diameter section.

10. The hanging device of claim 8, wherein said rear plate portion of each said connecting plate is further formed with a bottom screw hole located below and spaced apart from said engaging hole and extending along a front-rear direction, said hanging device further comprising two bottom fasteners that are movably and respectively screwed into said bottom screw holes of said rear plate portions of said connecting plates and that abut against said fixed plate.

11. The hanging device of claim 10, wherein each of said bottom fasteners includes a threaded shank portion extending along said front-rear direction, and a head portion formed at a rear end of said threaded shank portion and abutting against said fixed plate.

12. The hanging device of claim 8, wherein said main plate is formed with a central hole, and is provided with a plurality of sets of connecting units that are arranged around said central hole in an alternating manner, each of said connecting units including a plurality of angularly spaced-apart mounting holes formed in said main plate.

13. The hanging device of claim 6, wherein said abutment end plate has an arc-shaped cross section, and said connecting bracket is rotatable about said abutment end plate.

14. The hanging device of claim 13, wherein said supporting plate further includes a first protruding plate, said first protruding plate including a first horizontal plate section extending forwardly from a top end of said fixed plate, and a first vertical plate section extending upwardly from a front end of said first horizontal plate section, said abutment end plate being connected to a top end of said first vertical plate section, said second plate of said connecting bracket including two abutment portions located on left and right sides of and spaced apart from said first protruding plate.

15. The hanging device of claim 14, wherein said first protruding plate further includes two stop plates spaced apart from each other in said left-right direction, each of said stop plates being configured to abut against a respective one of said abutment portions to limit movement of said connecting bracket along said left-right direction.

16. The hanging device of claim 14, wherein said supporting plate further includes two second protruding plates located on said left and right sides of and spaced apart from said first protruding plate, each of said second protruding plates including a second horizontal plate section extending forwardly from said top end of said fixed plate, and a second vertical plate section extending upwardly from a front end of said second horizontal plate section, said abutment end plate being further connected to top ends of said second vertical plate sections of said second protruding plates, said second vertical plate section of each said second protruding plate being configured to abut against a respective one of said connectors to limit movement of said connecting bracket along said left-right direction.

17. A hanging device for hanging an object on a wall surface, comprising:
  a wall-connecting frame including a support bracket for fixing on the wall surface, and a connecting bracket hung movably on said support bracket, said connecting bracket being inverted U-shaped and having a rear end face for facing the wall surface, a front end face opposite to said rear end face, a plurality of connecting holes formed in said front end face and said rear end face, and two top screw holes spaced apart from each other in a left-right direction and extending along a top-bottom direction that is perpendicular to said left-right direction;
  two top fasteners movably and respectively screwed into said top screw holes and abutting against said support bracket;
  an object-connecting frame that is connected to said connecting bracket, that is located in front of said front end face of said connecting bracket, and that is adapted for connection with the object; and
  a plurality of connectors, each of which extends through one of said connecting holes in said rear end face of said connecting bracket and a corresponding one of said connecting holes in said front end face of said connecting bracket and each of which is connected to said object-connecting frame, said connectors being operable to move said object-connecting frame toward and away from said front end face of said connecting bracket.

* * * * *